(12) United States Patent
Miyakawa et al.

(10) Patent No.: US 7,931,833 B2
(45) Date of Patent: Apr. 26, 2011

(54) RESIN-CEMENTED OPTICAL ELEMENT, MOLD THEREFOR, FABRICATION PROCESS THEREOF, AND OPTICAL ARTICLE

(75) Inventors: Akiko Miyakawa, Sagamihara (JP); Hirofumi Ishiyama, Isehara (JP)

(73) Assignee: Nikon Corporation, Tokyo (JP)

( * ) Notice: Subject to any disclaimer, the term of this patent is extended or adjusted under 35 U.S.C. 154(b) by 5 days.

(21) Appl. No.: 12/564,680

(22) Filed: Sep. 22, 2009

(65) Prior Publication Data

US 2010/0007036 A1 Jan. 14, 2010

Related U.S. Application Data

(60) Division of application No. 11/175,259, filed on Jul. 7, 2005, now Pat. No. 7,622,181, which is a continuation of application No. 09/995,832, filed on Nov. 29, 2001, now abandoned.

(30) Foreign Application Priority Data

Nov. 30, 2000 (JP) .................................. 2000-365992
Jul. 31, 2001 (JP) .................................. 2001-231933

(51) Int. Cl.
*B29D 11/00* (2006.01)
*G02B 3/00* (2006.01)

(52) U.S. Cl. ......... 264/1.32; 264/1.7; 359/642; 359/708

(58) Field of Classification Search ................. 264/1.32, 264/1.7; 359/642, 708
See application file for complete search history.

(56) References Cited

U.S. PATENT DOCUMENTS

| 3,877,798 A | 4/1975 | Tolar et al. |
| 4,877,717 A | 10/1989 | Suzuki et al. |
| 4,883,548 A | 11/1989 | Onoki |
| 5,147,585 A | 9/1992 | Blum |
| 5,453,876 A | 9/1995 | Hamada |

FOREIGN PATENT DOCUMENTS

| JP | 02-130519 | 5/1990 |
| JP | 2-234103 | 9/1990 |
| JP | 05-045501 | 2/1993 |
| JP | 5-323104 | 12/1993 |
| JP | 07-032381 | 2/1995 |
| JP | 07-072310 | 3/1995 |
| JP | 07-108624 | 4/1995 |

OTHER PUBLICATIONS

U.S. Appl. No. 11/175,259, filed Jul. 7, 2005, Akiko Miyakawa, Nikon Corporation.
U.S. Appl. No. 09/995,832, filed Nov. 29, 2001, Akiko Miyakawa, Nikon Corporation.

(Continued)

*Primary Examiner* — Matthew J Daniels
*Assistant Examiner* — Jeremiah Smith
(74) *Attorney, Agent, or Firm* — Staas & Halsey LLP (57) ABSTRACT

The present invention provides a resin-cemented optical element comprising a base member 10 and a resin layer 11 formed on the surface of the base member; the resin layer 11 being in a thickness of 300 μm or smaller at least at some part of a peripheral portion (i.e., a region within 1 mm from the peripheral edge face 17 of the resin layer 11, or a region outside an effective-diameter region), and being in a thickness 12 of 850 μm or larger at a position which is thickest in the resin layer; a mold therefore; a manufacturing method thereof; and an optical article having this optical element.

10 Claims, 8 Drawing Sheets

OTHER PUBLICATIONS

Notice of Allowance mailed Jul. 13, 2009 in U.S. Appl. No. 11/175,259.
Advisory Action mailed Feb. 6, 2009 in U.S. Appl. No. 11/175,259.
Final Office Action mailed Oct. 29, 2008 in U.S. Appl. No. 11/175,259.
Non-Final Office Action mailed Jan. 10, 2008 in U.S. Appl. No. 11/175,159.
Abandonment mailed Jul. 13, 2005 in U.S. Appl. No. 09/995,832.
Final Office Action mailed Jan. 7, 2005 in U.S. Appl. No. 09/995,832.
Interview Summary mailed Oct. 21, 2004 in U.S. Appl. No. 09/995,832.
Non-Final Office Action mailed Jul. 19, 2004 in U.S. Appl. No. 09/995,832.
Final Office Action mailed Apr. 1, 2004 in U.S. Appl. No. 09/995,832.
Non-Final Office Action mailed Aug. 13, 2003 in U.S. Appl. No. 09/995,832.
Restriction Requirement mailed Mar. 25, 2003 in U.S. Appl. No. 09/995,832.

RESIN-CEMENTED OPTICAL ELEMENT, MOLD THEREFOR, FABRICATION PROCESS THEREOF, AND OPTICAL ARTICLE

CROSS-REFERENCE TO RELATED APPLICATIONS

This application is a Divisional Application of application Ser. No. 11/175,259, filed Jul. 7, 2005, now U.S. Pat. No. 7,622,181, which is a Continuation Application of application Ser. No. 09/995,832, filed Nov. 29, 2001, now abandoned, which claims the benefits of priority Japanese Patent Application No. 2000-365992 filed Nov. 30, 2000, and priority Japanese Patent Application No. 2001-231933 filed Jul. 31, 2001. The contents of U.S. application Ser. Nos. 09/995, 832 and 11/175,259, Japanese Application No. 2000-365992, and Japanese Application No. 2001-231933 are hereby incorporated by reference.

BACKGROUND OF THE INVENTION

1. Field of the Invention

This invention relates to a resin-cemented optical element, a mold used for producing the element, an optical article (or device) having the element, and fabrication process of the element 2. Description of the Related Art At present, optical elements are used in various fields. Depending on the purpose for which they are used, it is difficult to materialize required optical characteristics and so forth in some cases in respect of conventional spherical lenses. Accordingly, aspheric lenses are attracting notice. "Aspheric lens" is a generic term for lenses the curvature of which is kept continuously different over the region extending from the lens center toward the periphery. The use of aspheric lenses at some part of optical systems enables considerable reduction of the number of lenses necessary for the correction of aberrations, compared with a case where the optical system is comprised of only spheric lenses. This enables downsizing and weight reduction of the optical system. Also, the use of aspheric lenses enables high-grade correction of aberrations which is difficult for spherical lenses, and hence can bring about an improvement in image quality.

Aspheric lenses having such superior characteristics have not necessarily come into wide use. The greatest reason therefor can be said to be a difficulty in working. Conventional aspheric lenses have only be able to be produced by precisely polishing base members made of glass, and have involved the problem of a high processing cost.

In recent years, however, resin-cemented optical elements that materialize aspherical shapes by the aid of resin layers which can be made into any desired shapes with much greater ease than the precise polishing of glass have been put into practical use, so that aspheric lenses have rapidly come into wide use.

The resin-cemented optical element is an element in which a resin layer has been cemented to the surface of a base member made of glass or the like. This resin-cemented optical element is produced by a process such as a composite-type aspherical-surface molding process, in which, using a mold (such as a metal mold), a resin composition (inclusive of a resin precursor composition) is poured into a space between a base member and the mold, followed by curing to form on the base member surface a resin layer having any desired shape. In the present specification, a lens produced by this composite-type aspherical-surface molding process may be called a PAG (plastic adhesion glass) lens.

In the case when the resin-cemented optical element is thus produced by the composite-type aspherical-surface molding process, the base member may break when the resin cured on the base member is released from the mold. This phenomenon is remarkable especially when the resin layer has a large thickness. Accordingly, it has been impossible in practice to produce any PAG lens having a thick resin layer of 850 μm or larger in maximum layer thickness.

This phenomenon is considered to be caused by the adhesion of the resin layer to the mold. Usually, the resin is released from the mold by means of an ejector (ejection member) in such a way that a force acting in the direction where the former is released from the latter is applied to the base member at its part standing uncovered to the periphery of the element. Here, in the event that the resin layer remains without being released, in the state it has been kept adhered to the mold until the amount of deformation of the base member exceeds a tolerance limit, the base member breaks because of the distortion due to a deformation having exceeded the tolerance limit.

SUMMARY OF THE INVENTION

Accordingly, an object of the present invention is to provide a resin-cemented optical element having a thick resin layer, without causing any break of the base member, and to provide a mold used for producing the element and an optical article having the element.

To achieve the above object, the present invention provides a resin-cemented optical element comprising a base member and a resin layer formed on the surface of the base member, wherein the resin layer is in a thickness of 300 μm or smaller at least at a part of a peripheral portion (i.e., a region within 1 mm from the peripheral edge face of the resin layer, or a region outside an effective-diameter region), and is in a thickness of 850 μm or larger at a position which is thickest in the resin layer.

The present invention also provides a mold for forming a resin layer of a resin-cemented optical element having a base member and a resin layer formed on the surface of the base member, wherein the mold has, on the outer periphery on the outside of a molding surface, a concavely curved surface which has a curvature larger than the molding surface. It still also provides an optical article having the resin-cemented optical element of the present invention and a fabrication process of the element.

BRIEF DESCRIPTION OF THE DRAWINGS

These and other features, objects and advantages of the present invention will become more apparent from the following description when taken in conjunction with the accompanying drawings wherein.

DETAILED DESCRIPTION OF THE INVENTION

Figure 1:
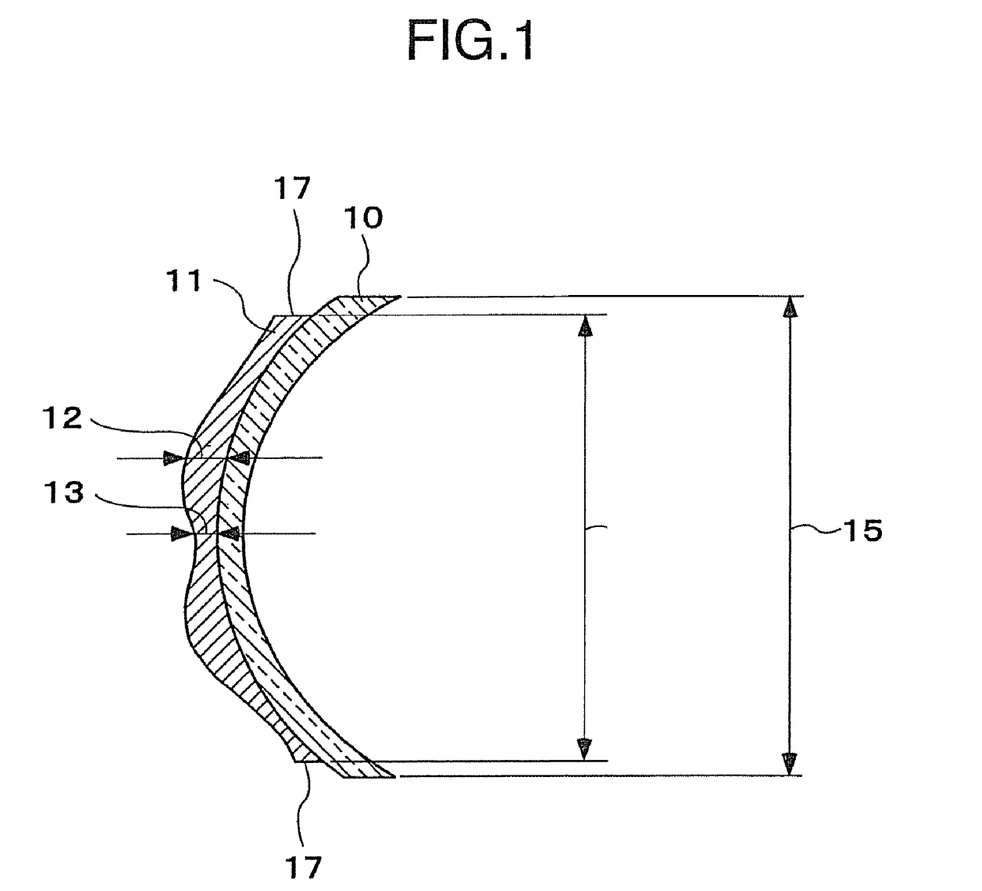
FIG. 1 is a cross-sectional view showing an example of the construction of the optical element according to the present invention.

In the resin-cemented optical element of the present invention, as shown in FIG. 1, a resin layer 11 has a thickness of 300 μm or smaller (preferably 100 μm or smaller) at least at some part of a peripheral portion (i.e., a region within 1 mm from the peripheral edge face 17 of the resin layer 11, or a region outside the effective-diameter region), and has a thickness of 850 μm or larger (preferably 1 mm or larger) as the maximum value of the thickness of the resin layer 11. Also, in order to attain necessary strength, optical characteristics and so forth, the resin layer 11 may preferably be formed usually in a thickness of at least 20 μm, without regard to the inside or outside of the peripheral portion. Incidentally, what is shown in FIG. 1 takes the case of an optical element whose resin layer molding surface is convex, to which, however, the present invention is by no means limited.

The resin layer may have the thickness of 300 μm or smaller at its whole peripheral portion, but may be enough as long as it has the thickness of 300 μm or smaller at least at some part of the peripheral portion. This is because the resin in the vicinity where a force for peeling is applied at the time of mold release may have layer thickness in this value. In the present invention, the resin present within 1 mm in periphery from the resin layer edge face closest to the part to which a force for mold release is to be applied (i.e., the part against which an ejector is to be pressed) may be in the thickness of 300 μm or smaller.

Here, the peripheral portion is meant to be a region within 1 mm from the peripheral edge face 17 of the resin layer 11, or a region outside the effective-diameter region. A region inside the effective-diameter region is meant to be a region through which light rays used in optical designing are transmitted, thus the region outside the effective-diameter region is meant to be a region except for this region. In general, the resin thickness of an element is strictly determined in accordance with the required optical characteristics. However, as long as it is in the region outside the effective-diameter region, it does not affect any optical characteristics of the element. Hence, the layer thickness can appropriately be selected.

In the optical element of the present invention, the resin layer may preferably have layer thickness which becomes gradually smaller toward the periphery, at least at some part of the peripheral portion. Making the resin layer have such a thickness that does not form any stair so as not to have any abrupt change in thickness is preferred because not only molds can be produced with easy but also any defects can be prevented that may occur because the resin can not turn around when a resin composition is poured into the mold.

Figure 2:
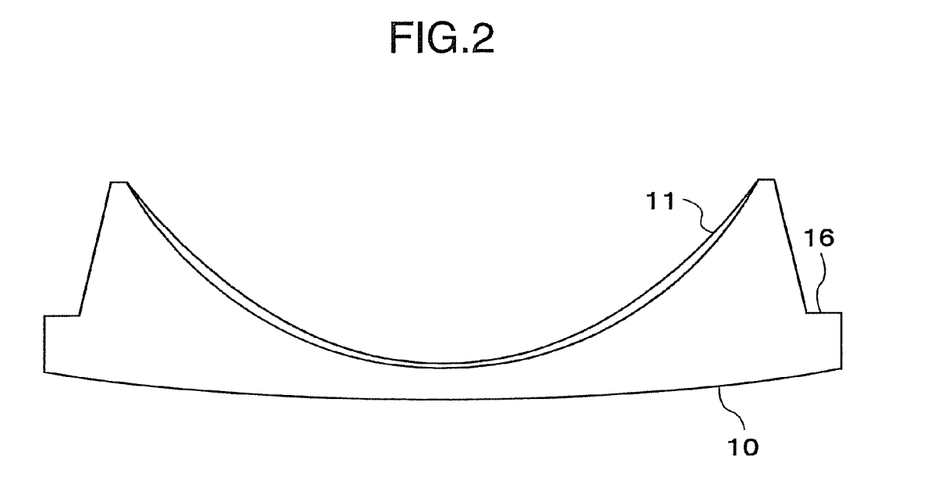
FIG. 2 is a cross-sectional view of an optical element having a stair.
Figure 3:
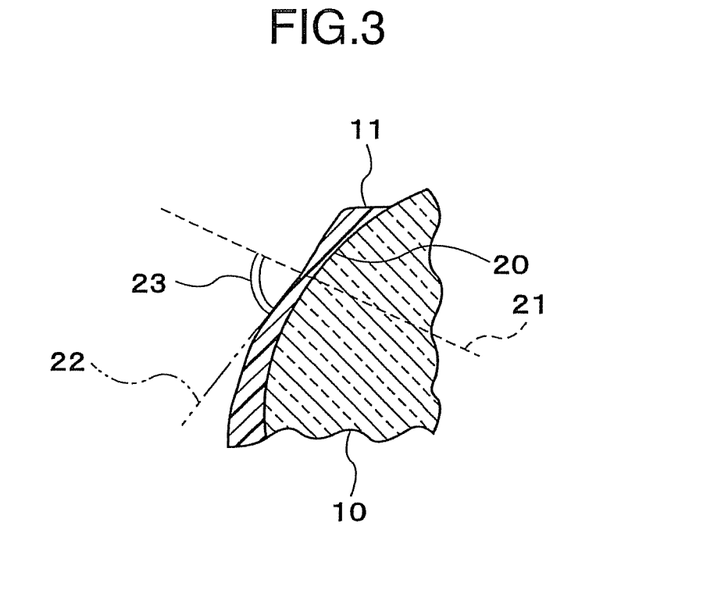
FIG. 3 is an illustration showing an angle at which a normal of the base member surface falls with a resin layer tangent plane.
Figure 4:
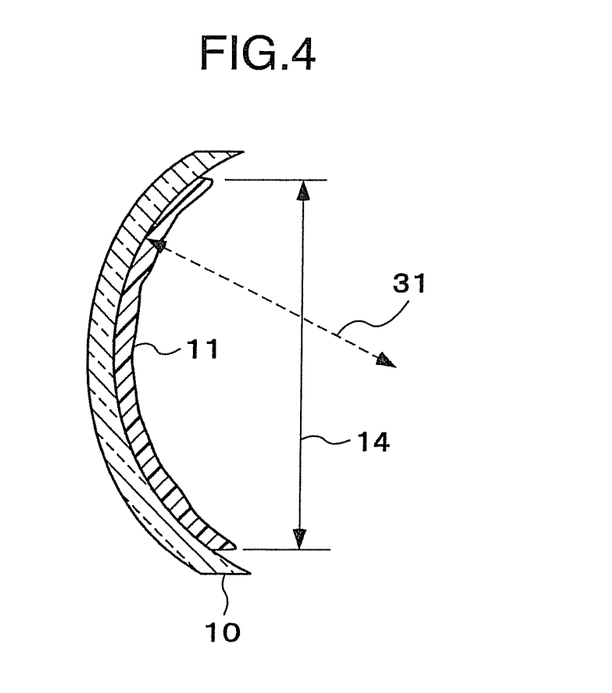
FIG. 4 is a cross-sectional view showing an example of the construction of the optical element according to the present invention.

According to the present invention, even a resin-cemented optical element having characteristic features a to k as shown below, having been considered impossible in elements having the resin layer of 850 μm or larger in maximum layer thickness, can be produced in a good yield without causing any break at the time of mold release.

a. As shown in FIG. 1, the resin layer 11 has a maximum layer thickness 12 which is at least four times a minimum layer thickness 13.

b. The resin layer 11 has a total mass of 700 mg or larger.

c. The resin layer 11 has an external diameter 14 of 34 mm or larger.

d. The base member 10 has a thickness of 10 mm or larger as maximum value.

e. The base member 10 has a thickness of 1 mm or smaller as minimum value.

f. The base member 10 has an external diameter 15 of 35 mm or larger.

g. As shown in FIG. 2, the base member 10 has a resin layer 11 molding surface which is a concave surface, and the base member 10 has along its periphery a stair 16 which protrudes in the peripheral direction (e.g., an attachment part for fastening the base member to a lens barrel). Incidentally, hatching is omitted in FIG. 2 in order to make the illustration easy to view.

h. As shown in FIG. 3, an angle 23 at which a normal 21 of the interface 20 between the base member 10 and the resin layer 11 falls with a tangent plane 22 on the outside of the resin layer is 80° or smaller as minimum value.

i. As shown in FIG. 4, the base member 10 has a resin layer 11 molding surface which is a concave surface, and the resin layer 11 has an external diameter 14 which is at least 1.2 times a curvature radius 31 of the concave surface.

j. As shown in FIG. 4, the base member 10 has a resin layer 11 molding surface which is a concave surface, and the resin layer 11 molding surface has a curvature radius 31 of 24 mm or smaller.

k. The base member has a resin layer molding surface which is a convex surface, and the resin layer has an external diameter which is at least 1.2 times a curvature radius of the convex surface.

According to the present invention, a resin-cemented optical element having a resin layer with a large maximum layer thickness can be obtained in a good yield.

There are no particular limitations on the base member used in the optical element of the present invention. Sol-gel glass, inorganic glass and organic glass may be used. Usually used are transparent materials having a refractive index of nd=1.4 to 2.0 and vd=20 to 100 in approximation. However, an opaque material or a semitransparent material may be used as the base member where the resin is not cured by exposure or, even when cured by exposure the resin can be exposed to light on the side of the mold.

Components constituting the inorganic glass may include, e.g., $SiO_2$, $B_2O_3$, $P_2O_5$, $Na_2O$, $K_2O$, CaO, BaO, MgO, ZnO, PbO, MnO, $Al_2O_3$ and $Fe_2O_3$. The organic glass may include poly(methyl methacrylate), polystyrene, poly(vinyl chloride), polyester, celluloid, and cellulose derivatives.

There are no particular limitations on the resin that constitutes the resin layer in the present invention, and any of photosensitive resins, thermosetting resins and thermoplastic resins may appropriately be selected as long as they can be molded by means of a mold. The thermosetting resins, which are suited for the present invention, may include, e.g., epoxy resins, urethane resins, thiourethane resins, unsaturated polyester resins, diallyl phthalate resins, and diethylene glycol bisallyl carbonate known under a trade name CR-39. Also, the thermoplastic resins may include poly(methyl methacrylate), polystyrene and polycarbonate. Photosensitive acrylic resins and photosensitive methacrylic resins are also preferable for the present invention.

A resin composition used in the optical element of the present invention may preferably have a viscosity before polymerization curing, of 50,000 cP or lower at room temperature. If it has a viscosity higher than 50,000 cP, a poor operability may result and besides some failure due to inclusion of bubbles may greatly occur.

The resin composition used in the present invention may appropriately optionally contain, in addition to the resin (or a precursor thereof), a polymerizing agent (curing agent), a polymerization initiator, a release agent, an anti-scratching agent and so forth.

The polymerizing agent and the polymerization initiator may appropriately be selected depending on the type of and curing conditions for the resin to be used, required film properties and so forth. As the releasing agent, usable are, e.g., neutralizable or non-neutralizable phosphate alcohols. The anti-scratching agent has the effect of smoothing the surfaces of cured products to improve resistance to scratching, and keeping any faults from occurring. This anti-scratching agent may include silicon oxides such as tetramethoxysilane, tetraethoxysilane, γ-methacryloxypropyltrimethoxysilane, γ-glycidyloxypropyltrimethoxysilane, and acrylate or methacrylate having an Si—O bond at some part of the backbone chain.

The resin-cemented optical element of the present invention may include, e.g., lenses, prisms and diffraction gratings. The present invention can bring about superior effects especially when applied to aspheric lenses. The present invention may also be applied to aspheric mirrors.

In particular, the optical element of the present invention is suited to optical articles (or devices) such as still cameras especially required to be made small-size and/or light-weight, such as analog still cameras and digital still cameras, video cameras, and interchangeable lens systems for these cameras, as well as spectacles, telescopes, binoculars, microscopes and optical disk/magneto-optic disk reading pickup lens systems. Accordingly, the present invention also provides these optical articles having the optical element of the present invention.

The resin layer of the resin-cemented optical element of the present invention can be formed by means of a molding tool the molding surface of which has an inverted shape of the resin shape described above. According to the molding of the resin layer of the resin-cemented optical element of the present invention, the thickness of a resin well formed on the outside of the resin layer outer edge at the time of molding can be made much smaller. Hence, in particular, it is preferable to use at a peripheral portion outside a molding surface (hereinafter often simply "molding surface peripheral portion") a mold having a concavely curved surface which has a larger curvature than the molding surface. Accordingly, the present invention provides a mold for molding the resin layer of the resin-cemented optical element; the mold having at its peripheral portion outside a molding surface a concavely curved surface which has a larger curvature than the molding surface. In such a mold, the resin layer surface (its base member side being regarded as the back) may be either of a concave surface and a convex surface. It may be used also for the molding of a lens having both the concave surface and the convex surface. It is effective especially when used for the molding of a concave lens (a lens the resin layer surface of which has a concave shape).

The concavely curved surface at the molding surface peripheral portion (hereinafter often simply "concavely curved surface") may preferably be at least 0.1 mm outside the effective-diameter region, and more preferably be at least 0.2 mm outside the effective-diameter region. Also, the edge of the curved surface (the position at which the curved surface begins as viewed on the inside of the effective-diameter region, i.e., the position at which the curvature changes from the curvature of the molding surface) may preferably be not distant by 0.5 mm or more from the effective-diameter region. The concavely curved surface may preferably be so hollowed inward that a cross section embracing an axis corresponding to the optical axis of the resin layer to be molded forms an inverted arc. Its curvature may appropriately be determined as long as it is larger than that of the molding surface, and may usually be 0.6 to 1.5 mm in radius. The distance between the base member of the element to be molded and the outer edge of the mold may preferably be so set as to be 1 mm or shorter.

The mold of the present invention may be produced by cutting or grinding, depending on materials. For example, where the mold is produced from a cuttable material such as electroless nickel plating (nickel formed by electroless plating), motion transfer type cutting may be performed by the use of a cutting tool having a cutting surface with a small curvature. This enables formation of the concavely curved surface at the molding surface peripheral portion of the mold.

However, such a cuttable material, though moldable with ease, often has a short lifetime because it tends to be scratched. Also, this method requires replacement of the cutting tool in the course of cutting, resulting in a high cost and besides tending to produce a difference in height at the surface formed.

Accordingly, in order to achieve mass production of optical elements, it is preferable to produce the mold with use of a hard material such as single-crystal silicon, SiC, CVD (chemical vapor deposition)-SiC, WC, SKD or hardened steel. These materials, however, can not be shaped by cutting, and must be shaped by grinding. Thus, in the method of motion transfer type cutting, the cutting object and the cutting tool may interfere with each other, and hence any concavely curved surface having a large curvature (i.e., having a small curvature radius) can not be formed.

Accordingly, in the case when the mold is produced by grinding, a form grinding wheel having a grinding surface in an inverted shape of at least part of the molding surface of the mold to be produced may be used so that the shape of the grinding surface can be transferred. Thus, a mold having the concavely curved surface having a large curvature can be obtained. According to the method in which the shape of the grinding surface is transferred using the form grinding wheel in this way, even a concavely curved surface having a small curvature radius (e.g., a curvature radius of 3 mm or smaller) can be formed at a low cost and as intended.

This form grinding wheel can be produced by, e.g., cutting a cuttable material such as brass to prepare a form grinding wheel base originally, and bonding abrasive grains to its grinding surface. Here, as the abrasive grains, it is preferable to use hard abrasive grains such as particles of single-crystal or polycrystalline diamond or CBN (cubic boron nitride). Also, the abrasive grains may be bonded by plating with a nickel alloy or the like.

The Preferred Embodiments

In the following Examples, the resin layer is irradiated by light (ultraviolet rays) on the side of the base member, and a mold made of metal is used as the mold. The present invention, however, is by no means limited to these. For example, a transparent material such as glass may also be used as the mold. In the case when such a light-transmitting material is used as the mold, the resin composition can be cured by irradiation on the mold side, and hence the base member need not be transparent.

Example 1

80 parts by weight of dimethacrylate represented by the following structural formula (1), having a weight-average molecular weight of 800, 19.5 parts by weight of urethane- modified hexamethacrylate represented by the following structural formula (2) and 0.5 part by weight of an acetophenone type photoinitiator were mixed to prepare a photosensitive resin composition, 1t1 wherein R is

1t2

Figure 5A:
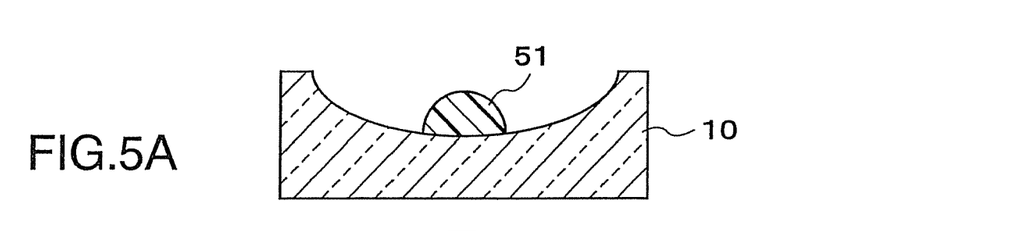
FIGS. 5A and 5B illustrate the steps of producing an optical element in Example 1.
Figure 5B:
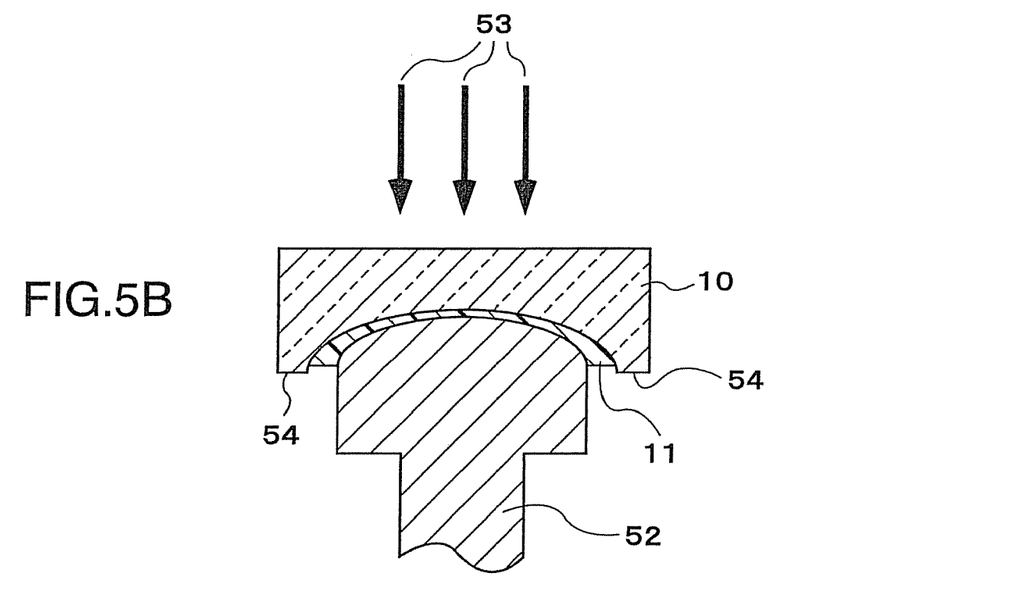
Figure 6:
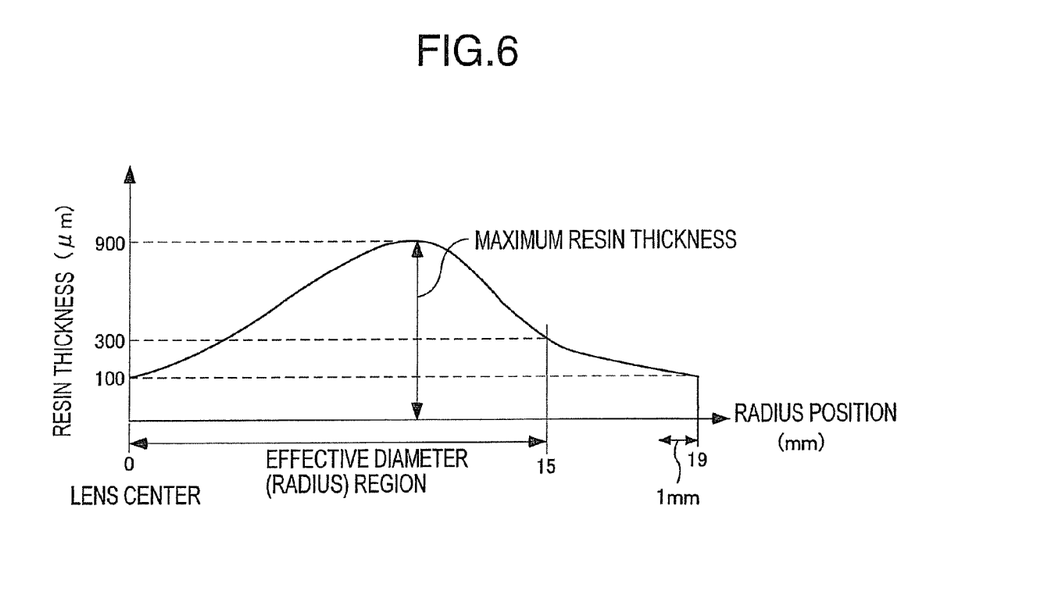
FIG. 6 is a graph showing resin thickness in the optical element produced in Example 1.

As shown in FIG. 5, on the resin layer molding surface (concave surface) of a glass base member (BK7) of 40 mm in external diameter (diameter), 1 mm in center thickness, 10 mm in maximum thickness and 18 mm in resin layer molding surface curvature, having been subjected to silane coupling treatment to improve adhesion to resin, the above resin composition, 51, was dropped. The glass base member 10, with its upside down, was pressed against a convex surface of an aspheric metal mold 52 to press and spread the resin composition 51 into the desired shape. Thereafter, on the base member side, the resin composition was irradiated by ultraviolet rays 53 for 5 minutes by means of a high-pressure mercury lamp at an illumination of 10 mW/cm$^2$ to effect curing to form a resin layer 11 having thickness distribution shown in FIG. 6.

Subsequently, the glass base member 10 was pushed with an ejector at the former's peripheral portion 54 to release the resin layer 11 from the metal mold 52 to obtain a PAG lens. Here, the resin layer was formed in an external diameter of 38 mm, a maximum resin thickness of 850 μm, a resin thickness outside the effective-diameter region (within 1 mm from the peripheral edge of the resin layer), of 300 μm or smaller, and a resin quantity of 700 mg. The amount of deformation of glass at the time of mold release was 20 μm.

The resin layer of the PAG lens obtained in the present Example has a large aspherical shape in a maximum thickness of 850 μm and a minimum thickness of 100 μm. Even though the resin layer was molded in such a large aspherical shape, the desired aspherical shape was exactly transferred, and a PAG lens having a precise aspherical surface was obtainable without any break of the base member at the time of mold release. Ten PAG lenses were produced in the same manner as the above. As the result, any break of the base member did not occur at all in all the lenses.

Example 2

Figure 7:
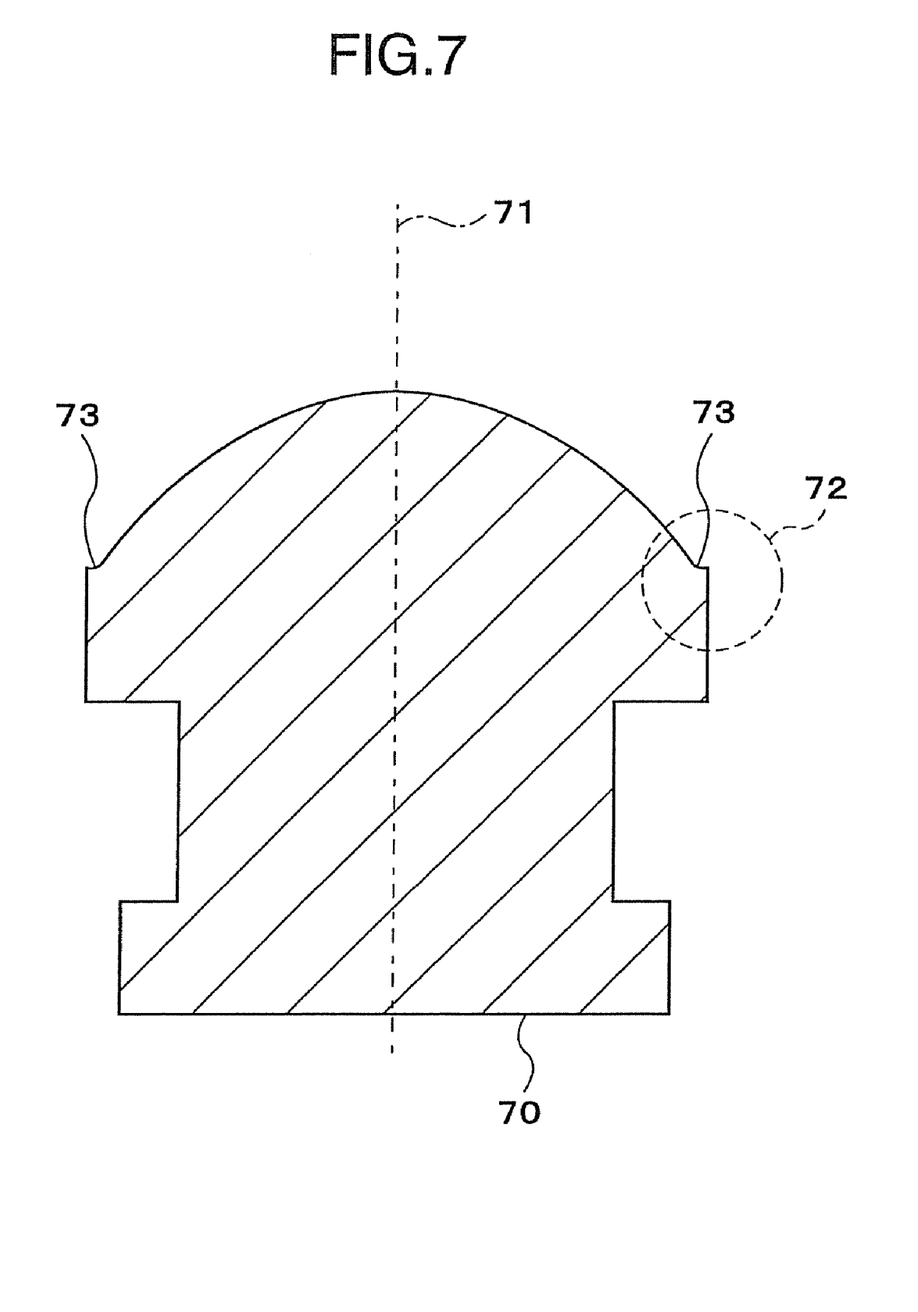
FIG. 7 is a cross-sectional view showing a mold used in Example 2.

In the present Example, a PAG lens was molded using a metal mold having the concavely curved surface at the molding surface peripheral portion. A cross section of an aspherical surface metal mold 70, cut along a plane embracing an axis 71 (in the present Example, the axis of rotation) corresponding to the optical axis of the lens to be molded, is shown in FIG. 7. An enlarged view of its peripheral portion 72 is shown in FIG. 8 in a state held at the time of molding.

Figure 8:
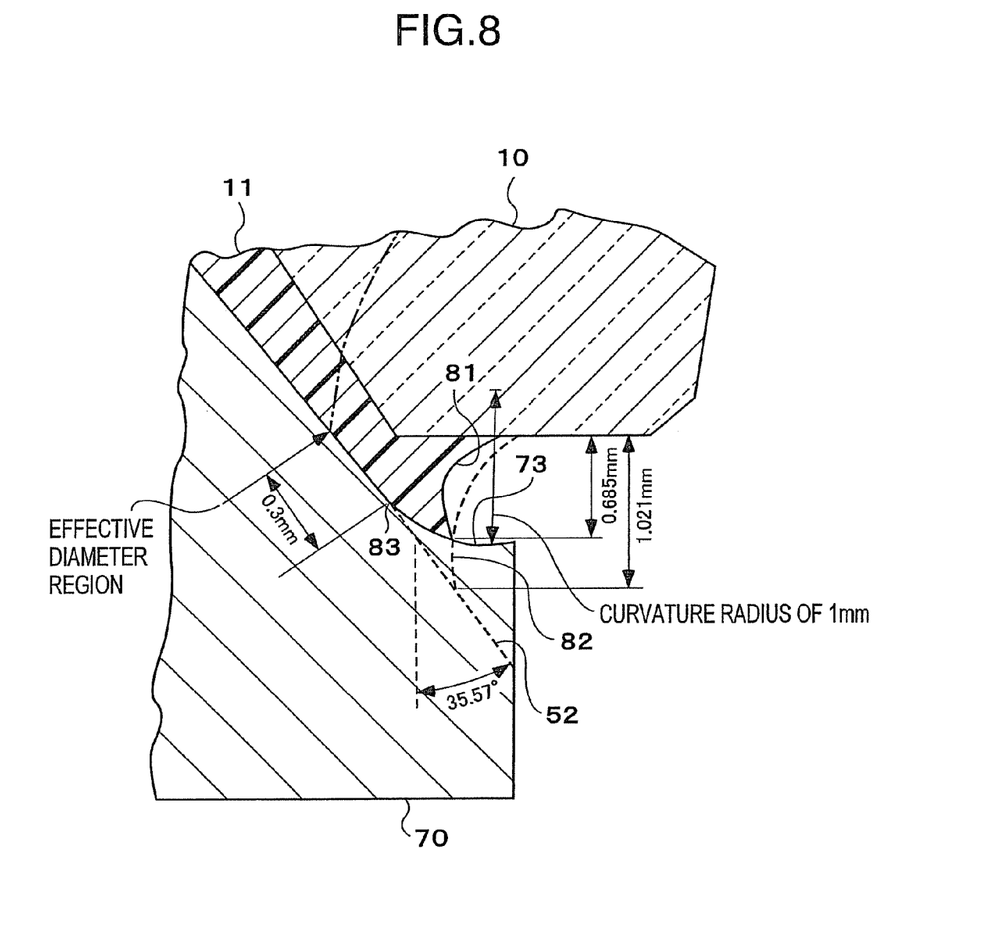
FIG. 8 is a cross-sectional view showing a peripheral portion of molding surface of the mold used in Example 2.

The metal mold 70 used in the present Example has, as shown in FIGS. 7 and 8, a concavely curved surface 73 at the molding surface peripheral portion. This concavely curved surface 73 is so formed that the cross section embracing an axis 71 corresponding to the optical axis of the resin layer to be molded forms an inverted arc having a curvature radius of 1 mm. The position 83 at which the curved surface begins as viewed on the side of the effective-diameter region is kept at 0.3 mm outside the effective-diameter region (diameter: 33.4 mm) of the lens to be molded.

According to the mold 70 of the present Example, the concavely curved surface 73 is provided at the molding surface peripheral portion. Hence, a resin well 81 can be made much thinner than a resin well 82 formed at the time of molding when the metal mold 52 of Example 1 is used.

Figure 9A:
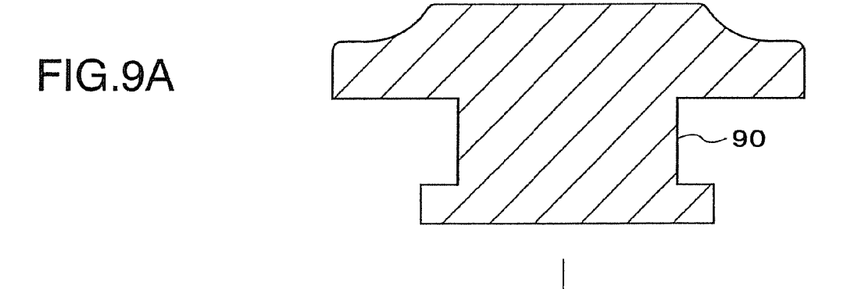
FIGS. 9A to 9C illustrate the steps of producing a mold used in Example 2.
Figure 9B:
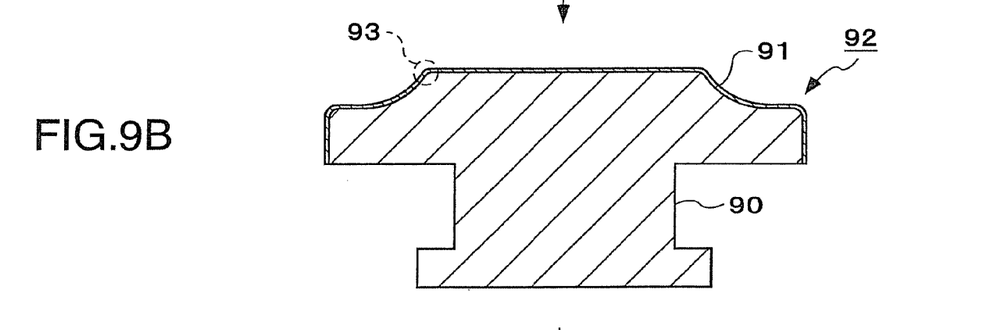

The metal mold 70 of the present Example was produced in the following way. First, brass was cut to originally prepare a form grinding wheel base 90 shown in FIG. 9A, and nickel alloy plating was applied to its grinding surface by the use of a plating solution mixed with abrasive grains. Thus, as shown in FIG. 9B, a form grinding wheel 92 having a plating layer 91 having abrasive grains on its surface was obtained. The grinding surface of this form grinding wheel 92 has an inverted shape of the molding surface of the metal mold 70 to be ground. More specifically, a convexly curved surface 93 is provided at the inner periphery of the grinding surface.

Figure 9C:
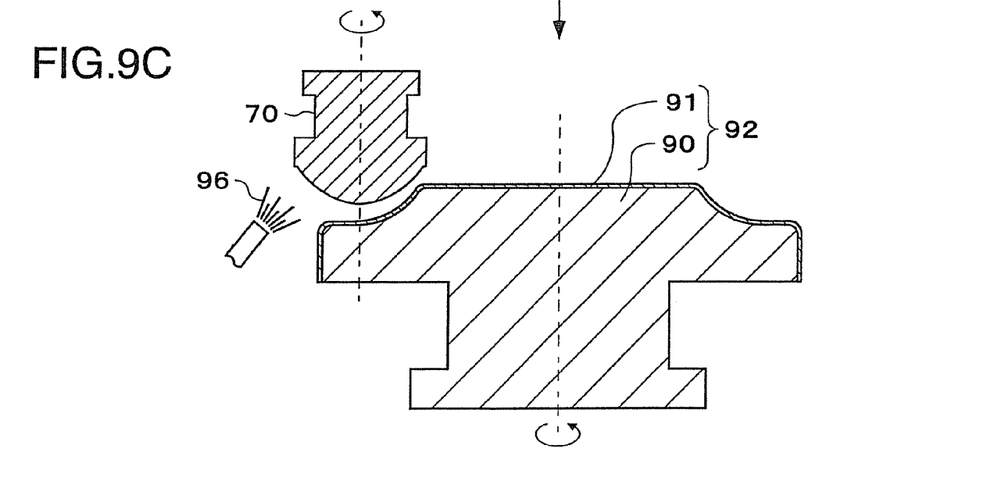

Subsequently, as shown in FIG. 9C, the grinding wheel 92 was rotated and a grinding fluid 96 was fed to the grinding surface, during which the surface of the mold 70 on its molding surface side was pressed against the grinding surface of the grinding wheel 92 to transfer the shape of the grinding wheel 92 to the surface of the mold 70. Thus, the mold 70 shown in FIGS. 7 and 8 was obtained, having the concavely curved surface 73 at the peripheral portion on the outside of the molding surface.

PAG lenses were produced in the same manner as in Example 1 except that the aspherical mold 70 produced as described above was used in place of the aspherical mold 52. As the result, any break of the base member did absolutely not occur in all the lenses.

Comparative Example 1

Ten PAG lenses were produced in the same manner as in Example 1 except that the resin layer outside the effective-diameter region was in a layer thickness of 800 μm. The amount of deformation of glass at the time of mold release was 80 μm on the average. Of the ten base members, five were seen to break.

While we have shown and described several embodiments in accordance with our invention, it should be understood that disclosed embodiments are susceptible of changes and modifications without departing from the scope of the invention. Therefore, we do not intend to be bound by the details shown and described herein but intend to cover all such changes and modifications a fall within the ambit of the appended claims.

What is claimed is:

1. A fabrication process for a resin-cemented optical element, comprising:
    providing a base member having an external diameter and a periphery;
    forming a resin layer having an external diameter and a peripheral edge face on a surface of said base member, wherein:
    said base member and said resin layer are in a concentric shape seen from an optical axis direction and
    said external diameter of said base member is larger than said external diameter of said resin layer;
    extending said resin layer between said base member and a mold having an aspherical shape, and transferring said aspherical shape of said mold to said resin layer;
    wherein said transferring forms a peripheral portion of said resin layer, that is a region within 1 mm from said peripheral edge face of said resin layer, having a thickness of 300 μm or smaller for at least some part of said peripheral portion and
    a region of said resin layer that is inside by 1 mm or more from said peripheral edge face of said resin layer having a thickness of 850 μm or larger as maximum thickness of said resin layer; and
    pushing an exposed region of said base member that is not covered with said resin layer with an ejector to release said optical element from the mold having said aspherical shape.

2. The fabrication process according to claim 1, wherein said base member has a maximum thickness of 10 mm or larger.

3. The fabrication process according to claim 1, wherein said base member has a minimum thickness of 1 mm or smaller.

4. The fabrication process according to claim 1, wherein said external diameter of said base member is 35 mm or larger.

5. The fabrication process according to claim 1, wherein:
    said resin layer has a molding surface which is a concave surface,
    said exposed region of said base member that is not covered with said resin layer is a stair in said periphery that protrudes in the peripheral direction, and
    said stair is used as an attachment part for fastening said base member to a lens barrel.

6. A fabrication process for a resin-cemented optical element, comprising:
    providing a base member having an external diameter and a periphery,
    forming a resin layer having an external diameter and a peripheral edge face on a surface of said base member, wherein:
    said base member and said resin layer are in a concentric shape seen from an optical axis direction and
    said external diameter of said base member is larger than said external diameter of said resin layer;
    extending said resin layer between said base member and a mold having an aspherical shape, and transferring said aspherical shape of said mold to said resin layer;
    wherein said transferring forms an effective diameter region of said resin layer through which light rays used in said optical element are transmitted,
    an outside region of said resin layer which is outside of said effective diameter region having a thickness of 300 μm or smaller at where a force of peeling is applied,
    an inside region of said resin layer which is inside of said effective diameter region having a thickness of 850 μm or larger as maximum thickness of said resin layer; and
    pushing an exposed region of said base member that is not covered with said resin layer with an ejector to release said optical element from the mold having said aspherical shape.

7. The fabrication process according to claim 6, wherein said base member has a maximum thickness of 10 mm or larger.

8. The fabrication process according to claim 6, wherein said base member has a minimum thickness of 1 mm or smaller.

9. The fabrication process according to claim 6, wherein said external diameter of said base member is 35 mm or larger.

10. The fabrication process according to claim 6, wherein:
    said resin layer has a molding surface which is a concave surface,
    the exposed region of the base member that is not covered with said resin layer is a stair in said periphery, protruding in the peripheral direction, and
    said stair is used as an attachment part for fastening said base member to a lens barrel.

* * * * *